(12) United States Patent
Nagayama

(10) Patent No.: US 6,629,891 B2
(45) Date of Patent: Oct. 7, 2003

(54) IMPACT JUDGEMENT METHOD AND DEVICE, COMPUTER-READABLE RECORDING MEDIUM RECORDING IMPACT JUDGEMENT PROCESSING PROGRAM, AND VIDEO GAME DEVICE

(75) Inventor: Kentaro Nagayama, Osaka (JP)

(73) Assignee: Konami Corporation, Tokyo (JP)

( * ) Notice: Subject to any disclaimer, the term of this patent is extended or adjusted under 35 U.S.C. 154(b) by 155 days.

(21) Appl. No.: 09/994,355

(22) Filed: Nov. 26, 2001

(65) Prior Publication Data

US 2002/0065133 A1 May 30, 2002

(30) Foreign Application Priority Data

Nov. 29, 2000 (JP) ........................................ 2000-363542

(51) Int. Cl.[7] ................................................ A63F 13/00
(52) U.S. Cl. ...................................................... 463/32
(58) Field of Search ............................ 463/30, 31, 32, 463/33, 34, 43; 345/418, 473, 474, 475

(56) References Cited

U.S. PATENT DOCUMENTS

| | | | |
|---|---|---|---|
| 5,748,198 A | 5/1998 | Takeda et al. | |
| 6,128,018 A | 10/2000 | Nakajima | |
| 6,368,217 B2 | * 4/2002 | Kanno et al. | 463/36 |
| 6,570,569 B1 | * 5/2003 | Tsukamoto et al. | 345/473 |
| 2002/0016204 A1 | * 2/2002 | Kanno et al. | 463/36 |

FOREIGN PATENT DOCUMENTS

EP 0973132 1/2000

* cited by examiner

Primary Examiner—Kim Nguyen
(74) Attorney, Agent, or Firm—Jordan and Hamburg LLP

(57) ABSTRACT

To judge impacts with a three-dimensional model constituted by a plurality of polygons, rapidly and accurately. The vertex-coordinates of the partial models constituting the three-dimensional model are represented by central-coordinates being the average values of the maximum values and minimum values of respective coordinate components, an expansion factor for achieving prescribed values by multiplication by the differentials between the maximum values and minimum values of each coordinate component, and converted vertex-coordinates obtained by subtracting the central-coordinates from the respective vertex-coordinates and then multiplying by the expansion factor; the central-coordinates and the expansion factor being stored as floating-point values, and the converted vertex-coordinates being stored as integers (ST3). Moreover, a judgement subject partial model, being a partial model of the partial models constituting the three-dimensional model to which impact judgement is to be applied, is selected (ST1), and impact judgement is performed with respect to this judgement subject partial model (ST7–ST11).

10 Claims, 10 Drawing Sheets

IMPACT JUDGEMENT METHOD AND DEVICE, COMPUTER-READABLE RECORDING MEDIUM RECORDING IMPACT JUDGEMENT PROCESSING PROGRAM, AND VIDEO GAME DEVICE

BACKGROUND OF THE INVENTION

1. Field of the Invention

The present invention relates to impact judgement technology for judging impacts between three-dimensional models and moving objects in an artificial three-dimensional space, as used in a video game device, for example.

2. Description of the Related Art

In recent years, a variety of game devices have become widely used for displaying characters moving in an artificial three-dimensional space on a monitor screen. In these game devices, games simulating car races, skiing, surfing, motor boats, snowboards, skateboards, and the like, are known.

Moreover, in games involving moving characters, immobile objects which do not perform movement, such as geographical features, including land surface, mountains, rivers, and the like, are also displayed in the artificial three-dimensional space. These geographical non-moving objects are constituted by three-dimensional models comprising a combined plurality of polygons having quadrilateral shapes.

The game is developed by moving the characters according to the operations of the player, within the space in which the non-moving objects are drawn. Moreover, if a character contacts a non-moving object during development of the game, this is represented in the game by generating a sound effect at that timing, or the like, thereby increasing interest in the game. Consequently, it is necessary to perform impact judgement to determine whether or not the character has made contact with a non-moving object.

On the other hand, in order to depict background images in a realistic manner, the non-moving objects, such as geographical features, and the like, within the space in which the character is moving are constituted by an extremely large number of polygons. Therefore, a large amount of time is needed to perform the aforementioned impact judgement, and hence it is difficult to execute impact judgement at the appropriate timing.

Therefore, the present invention was devised with the foregoing problem in view, an object thereof being to provide an impact judgement method and device, a computer-readable recording medium recording an impact judgement processing program, and a video game device, whereby impacts between a moving object moving in an artificial three-dimensional space and three-dimensional model constituted by a plurality of polygons can be performed rapidly and accurately.

SUMMARY OF THE INVENTION

In order to achieve the above object, according to the present invention, an impact judgement device for judging impacts between a moving object moving in an artificial three-dimensional space and a three-dimensional model constituted by a plurality of polygons, the impact judgement device comprises: model storing means for storing the vertex-coordinates of the respective polygons of said three-dimensional model, and impact judging means for performing impact judgement using the movement vector of said moving object and said vertex-coordinates; wherein said model storing means represents said vertex-coordinates by means of central-coordinates being an average value of the maximum value and minimum value of the each of the coordinate components, an expansion factor to be used for achieving prescribed value by multiplication by the difference between the maximum value and minimum value of each coordinate component, and converted vertex-coordinates obtained by subtracting said central-coordinates from the respective vertex-coordinates and then multiplying by said expansion factor; and stores said central-coordinates and said expansion factor in a floating-point value form, and said converted vertex-coordinates in an integer form.

According to the above described invention, vertex-coordinates which are conventionally stored as 32-bit floating point values, are expressed by central-coordinates, an expansion factor and converted vertex-coordinates, and since the converted vertex-coordinates are stored as 16-bit integer values, the memory capacity used to store the vertex-coordinates is reduced by approximately one-half, and impact judgement is performed rapidly.

These and other objects, features, and advantages of the present invention will become more apparent upon reading of the following detailed description along with the accompanied drawings.

DETAILED DESCRIPTION OF INVENTION

Figure 1:
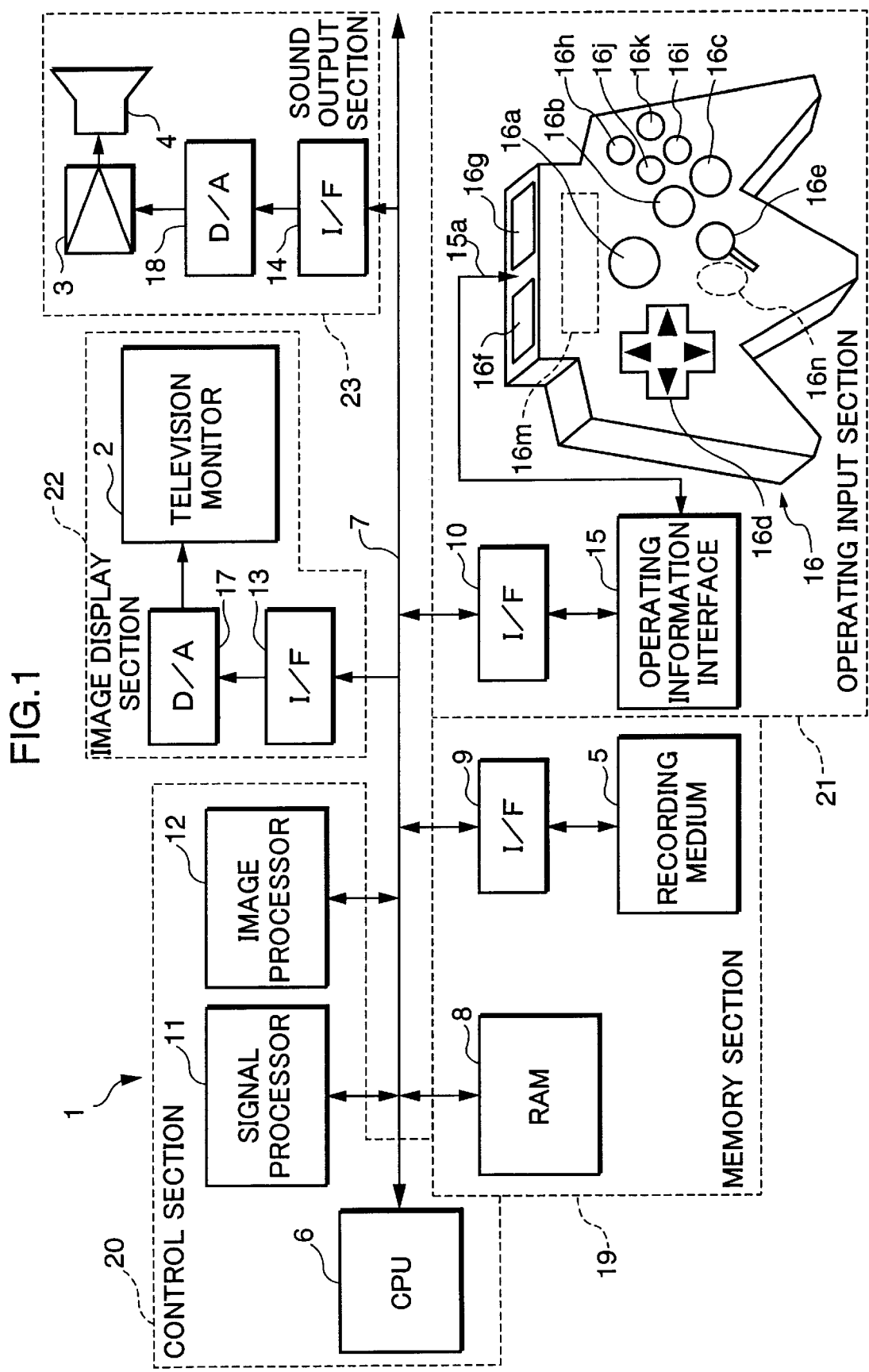
FIG. 1 is a block diagram showing one embodiment of video game device to which the present invention is applied.

FIG. 1 is a block composition diagram showing one embodiment of a video game device to which the present invention is applied.

This game device 1 comprises: a game device main unit; a video monitor 2 for outputting game images; an amplifying circuit 3 and speaker 4 for outputting sound effects, or the like, in the game; and a storage medium 5 whereon game data comprising images, sound sources and program data is stored. The storage medium 5 is, for example, a so-called ROM cassette, comprising a ROM, or the like, accommodated in a plastic case, or an optical disk, flexible disk, or the like, on which the aforementioned game data and/or operating system program data is stored, and depending on the embodiment of the game device 1, it may also be an internal ROM, or the like.

In the game device main unit, a bus 7 comprising an address bus, data bus and control bus is connected to a CPU 6, and furthermore, a RAM 8, interface circuit 9, interface circuit 10, signal processor 11, image processor 12, interface circuit 13, and interface circuit 14 are respectively connected to the bus 7. A controller 16 is connected to the interface circuit 10 via an operating information interface circuit 15, a D/A converter 17 is connected to the interface circuit 13, and a D/A converter 18 is connected to the interface circuit 14.

A memory section 19 is constituted by the RAM 8, interface circuit 9 and storage medium 5; a control section 20 for controlling the development of the game is constituted by the CPU 6, signal processor 11 and image processor 12; an operation input section 21 is constituted by the interface circuit 10, operating information interface circuit 15 and controller 16; an image display section 22 is constituted by the video monitor 2, interface circuit 13 and D/A converter 17; and a sound output section 23 is constituted by the amplifying circuit 3, speaker 4, interface circuit 14 and D/A converter 18.

The signal processor 11 principally carries out calculations of the position of a character, and the like, in an artificial three-dimensional space, calculations to convert the position in the artificial three-dimensional space to a position in a two-dimensional space, light source calculation processing, and various sound source data readout and synthesis processing.

The image processor 12 performs processing for positioning polygons constituting an image to be drawn in the display area of the RAM 8, and rendering processing, such as texture mapping onto these polygons, on the basis of the calculation results form the signal processor 11.

The controller 16 comprises various buttons and joysticks, and serves to supply game content selections, start instructions, and also action instructions and direction instructions, and the like, relating to the main character.

The aforementioned game device 1 may be embodied in different modes depending on the application thereof. In other words, if the game device 1 is made for domestic use, the video monitor 2, amplifying circuit 3 and speaker 4 are constituted separately from the game device main unit. Moreover, if the game device 1 is made from commercial use, then the constituent element illustrated in FIG. 1 are all accommodated inside a single case forming an integral unit.

Furthermore, if the game device 1 is constituted on the basis of a personal computer or work station, then the video monitor 2 will correspond to the display of the computer, the image processor 12 will correspond to a portion of the game program data stored in the storage medium 5 or to hardware on an expansion board fitted to an expansion slot of the computer, and the interface circuit 9, 10, 13, 14, D/A converter 17, 18, and the operating information interface circuit 15 will correspond to hardware on an expansion board fitted to an expansion slot of the computer. Moreover, the RAM 8 will correspond to respective areas of the main memory or expanded memory of the computer.

This embodiment relates to an example where the game device 1 is made for domestic use.

Firstly, the general operation of the game device 1 is described. When power is supplied to the game device 1 by turning the power switch (not illustrated) on, the CPU 6 reads out image, sound source and game program data from the storage medium 5, on the basis of an operating system stored in the storage medium 5. All or a portion of the image, sound source and game program data read out is stored in the RAM 8.

Thereupon, the CPU 6 develops the game on the basis of the game program data stored in the RAM 8, and the instruction contents input by the game player via the controller 16. In other words, the CPU 6 generates task commands for drawing and outputting sounds, and the like, appropriately, on the basis of the instruction contents supplied by the game player via the controller 16.

On the basis of the aforementioned commands, the signal processor 11 calculates a virtual camera position, and the like, in a three-dimensional space (naturally, the same also applies to a two-dimensional space), calculates a light source, and reads out and synthesizes various sound source data.

The image processor 12 then performs write processing, and the like, for the image data that is to be drawn to the display area of the RAM 8, on the basis of the aforementioned calculational processing. The image data written to the RAM 8 is supplied via an interface circuit 13 to a D/A converter 17, where it is converted to an analogue video signal and supplied to the video monitor 2, which displays the data as an image on the screen.

Figure 2:
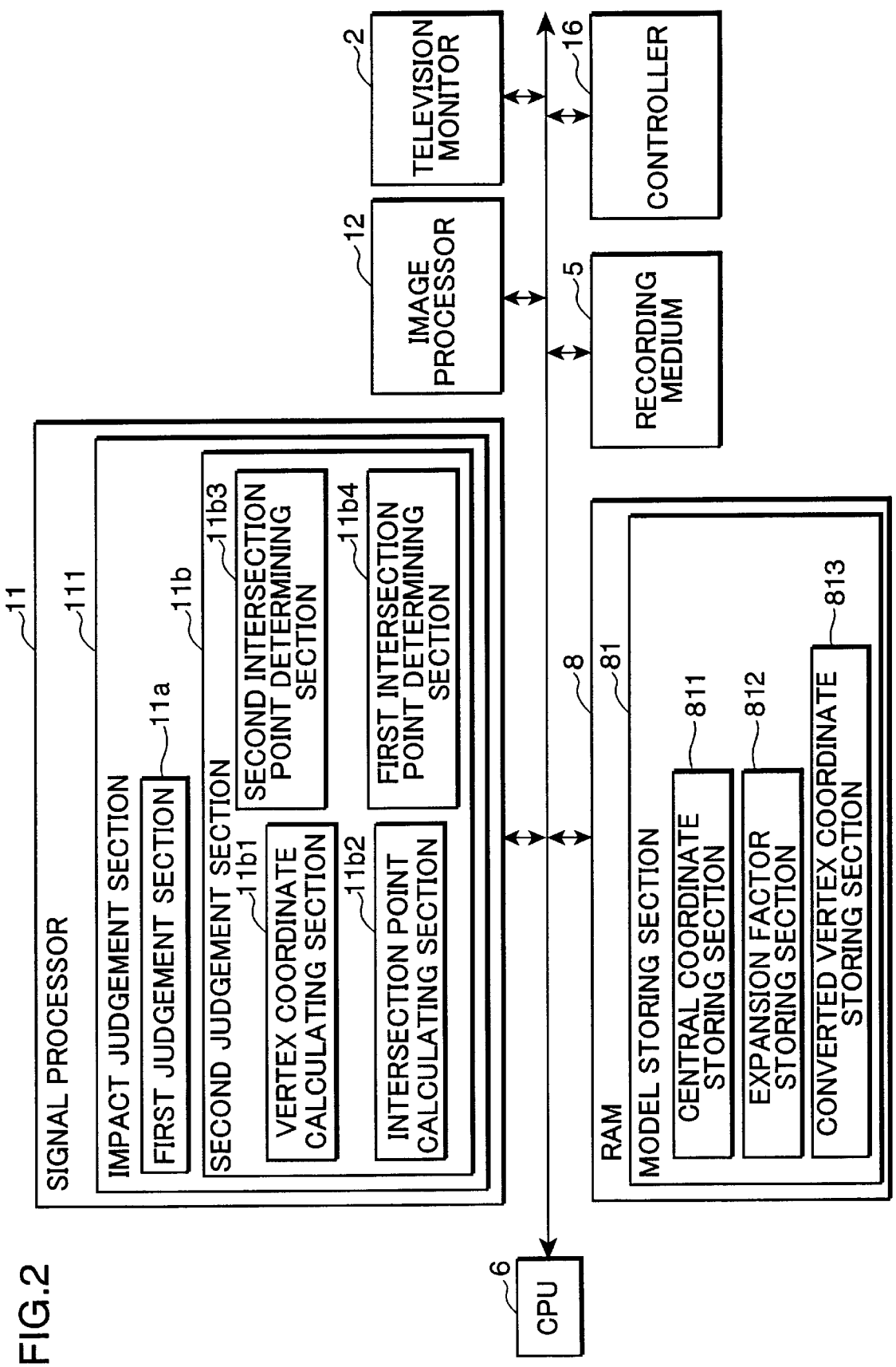
FIG. 2 is a block diagram showing the principal part of an impact judgement device.

FIG. 2 is a block diagram showing a principal section of an impact judgement device. The signal processor 11 comprises an impact judgement section 111 (impact judging means) which reads out vertex-coordinates for a three-dimensional model from a model storing section 81 (model storing means), and performs impact judgement using the vertex-coordinates and a movement vector for the moving object. Here, taking the "moving point" as the point of the moving object at which impact between the moving object and a three-dimensional model is judged, the movement vector is the vector having a starting point which is the current position of the moving point and an end point which is the predicted position of the moving point after a prescribed unit time period. Moreover, if the current position and predicted position of the centre of the moving object (centre of the local coordinates of the moving object) used when positioning the moving object in the artificial three-dimensional space are given, then the movement vector should be taken as a vector obtained by moving the vector having a start point at the current position of the centre and an end point at the predicted position of the centre by a vector having a start point at the centre of the moving object (in the local coordinates) and an end point at the moving point.

Figure 3:
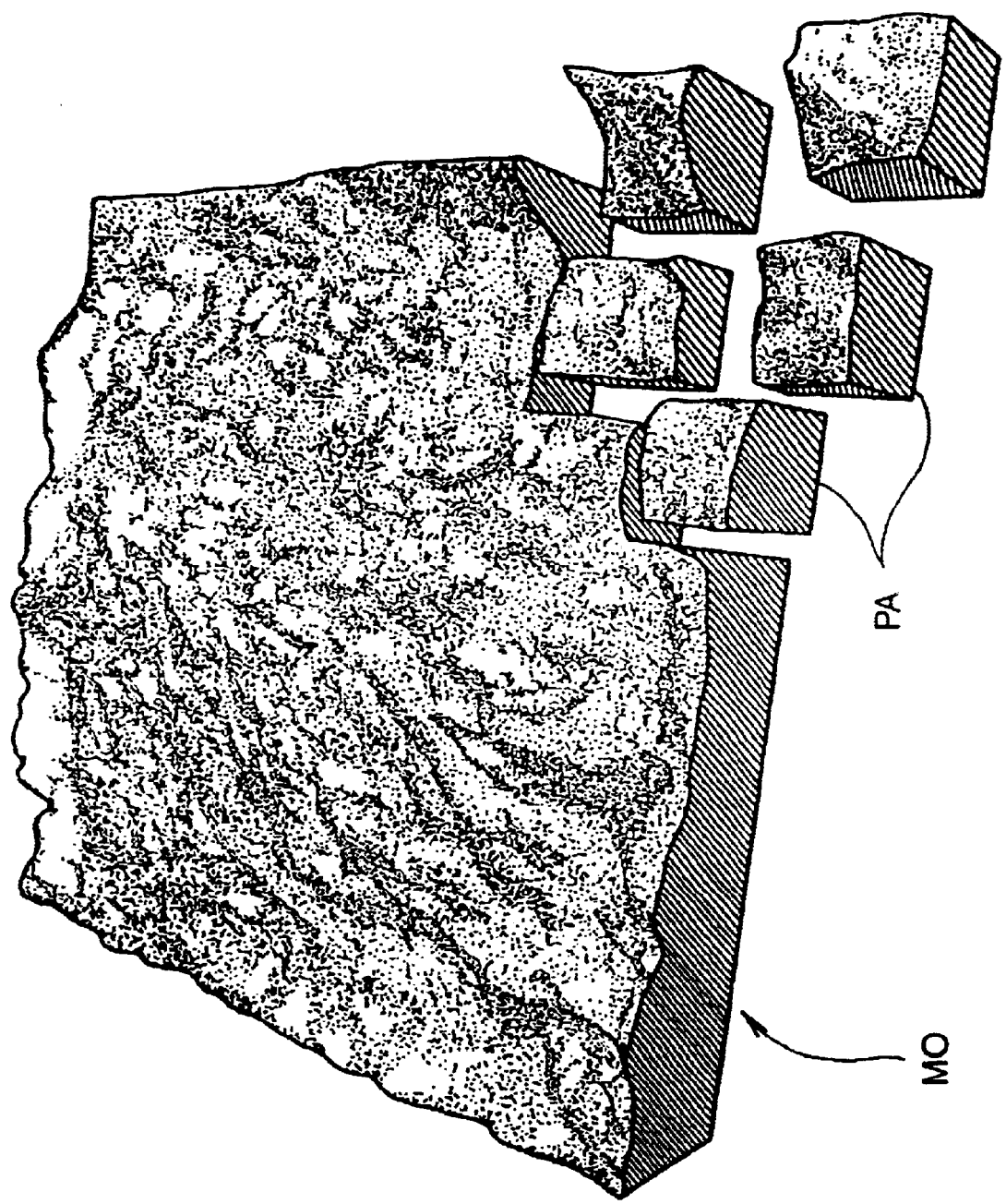
FIG. 3 is an illustrative diagram showing one example of a case where a three-dimensional model is constituted by a plurality of partial models.

Furthermore, the RAM 8 comprises a model storing section 81 for storing vertex-coordinates of a three-dimensional model (model storing means). Here, the three-dimensional model is constituted by combining a plurality of partial models. For example, if the three-dimensional model MO is a model representing a complex topological shape as shown in FIG. 3, then this three-dimensional model MO is formed by combining a plurality of partial models PA. In order to represent subtle undulations in the topological shape as shown in FIG. 3, the number of polygons constituting the three-dimensional model becomes extremely large. Moreover, the polygons constituting the three-dimensional model are taken to be triangular polygons.

The impact judgement section 111 comprises a first judgement section 11a (first judging means) for selecting a judgement subject partial model, being a partial model taken as the subject for impact judgement, from the partial model constituting the three-dimensional model, and a second judgement section 11b (second judging means) for performing impact judgement with respect to the polygons constituting the judgement subject partial model.

The first judgement section 11 a sets as the aforementioned judgement subject partial model, a partial model which contains all or a portion of the line linking the start point and end point of the movement vector, when the movement vector and three-dimensional model are projected onto a two-dimensional plane. For example, if the three-dimensional model is a topographical model, the judgement subject partial model must be selected by using a plan view in which the movement vector and three-dimensional model are projected in the height direction, by parallel light rays.

The second judgement section 11b comprises: a vertex coordinate calculating section 11b1(vertex-coordinates calculating means) for calculating respective vertex-coordinates from central-coordinates, an expansion factor, and converted vertex-coordinates; an intersection calculating section 11b2 (intersection calculating means) for calculating the coordinates of the intersection point between the plane containing the respective polygons and the straight line containing the movement vector; a first intersection judgement section 11b3 (first intersection point judging means) for judging whether or not the aforementioned intersection point lies on a line linking the start point and end point of the movement vector; and a second intersection judgement section 11b4 (second intersection judging means) for judging whether or not the aforementioned intersection point is a point within said polygons.

The vertex-coordinates calculating section 11b1 calculates the respective vertex-coordinates by dividing the converted vertex-coordinates by the expansion ratio, and then adding the central-coordinates to the result. This calculation processing is required in order to store the vertex-coordinates by means of central-coordinates, expansion factor and converted vertex-coordinates, with the aim of reducing the storage volume and increasing the speed of processing. The intersection calculating section 11b2 first determines the equation of the plane containing the respective polygons, then determines the equation of the straight line containing the movement vector, and then derives the coordinates of the intersection point thereof, by solving the plane equation and straight line equation simultaneously.

The first intersection determining section 11b3 judges whether or not each component of the intersection coordinates lies within the range of the respective components of the coordinates of the start point and end point of the movement vector. If they do come within this range, then it is judged that the intersection point lies on a line linking the start point and end point of the movement vector. The second intersection judgement section 11b4 is explained in detail below, but it determines whether or not the intersection point is a point within the relevant polygons, by using the positive or negative result of each component of the external product of the vectors starting at the intersection point and ending at the respective vertices and the vectors starting and ending at the respective vertices.

The model storing section 81 comprises a central-coordinates storing section 811 for storing central-coordinates, being an average value of the maximum value and minimum value of the respective coordinate components, an expansion factor storing section 812 for storing an expansion factor for achieving a prescribed value (here, the maximum value is 65535=16-bit integer) by multiplying it by the difference between the maximum value and minimum value of the respective coordinate components, and a converted vertex-coordinates storing section 813 for storing converted vertex-coordinates obtained by subtracting the central-coordinates from the respective vertex-coordinates and then multiplying by the expansion factor.

Figure 4:
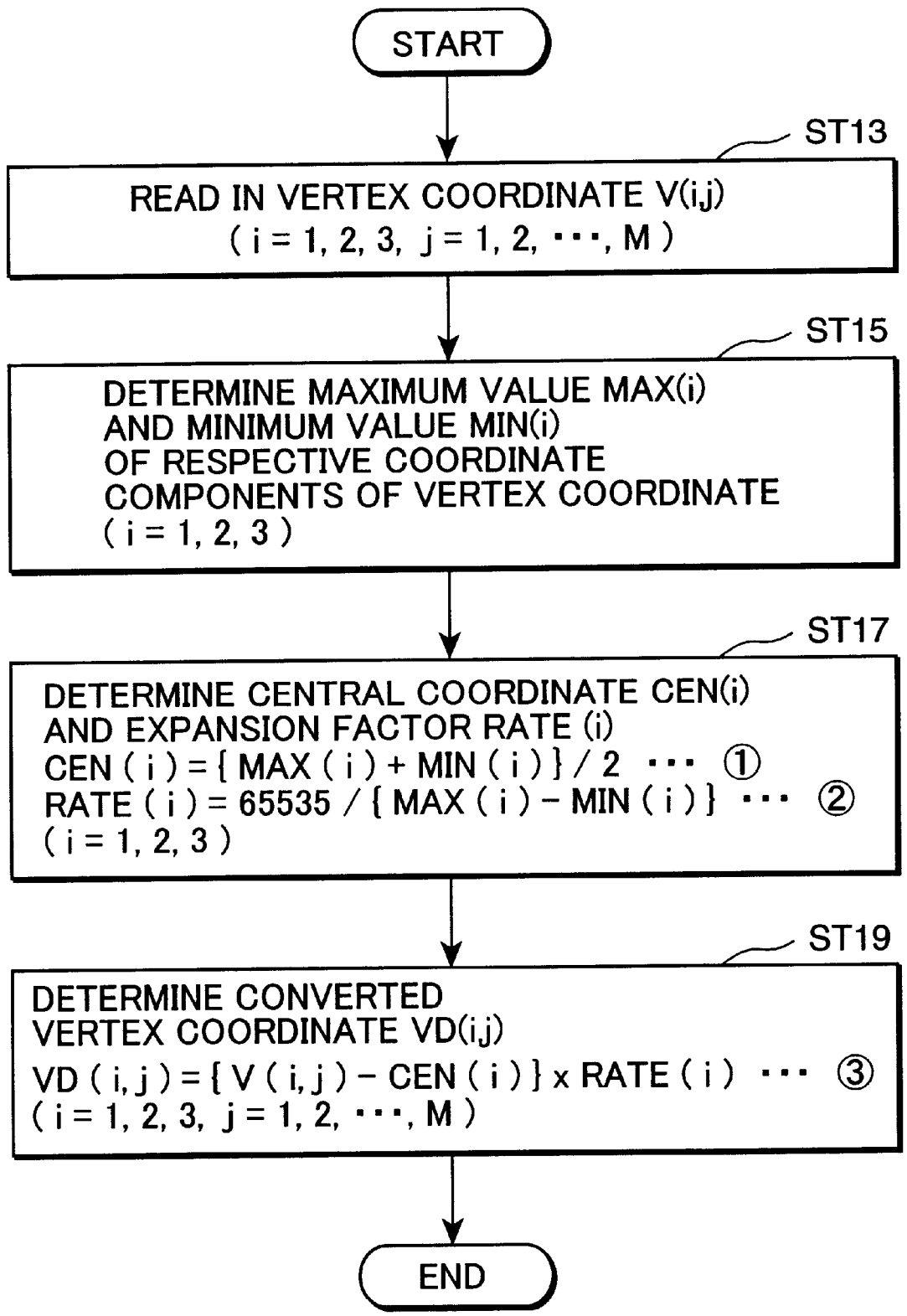
FIG. 4 is a flowchart for determining central-coordinates, an expansion factor and converted vertex-coordinates.

FIG. 4 is a flowchart for determining the central-coordinates, expansion factor and converted vertex-coordinates, from the vertex-coordinates of the partial models constituting the three-dimensional model. Here, the vertex-coordinates, central-coordinates and expansion factor are expressed as 32-bit floating-point values, and the converted vertex-coordinates are expressed as 16-bit integers. In the present embodiment, the processing described here is performed in advance, and the vertex-coordinates are expressed by means of the central-coordinates, expansion factor and converted vertex-coordinates, and are stored in the RAM 8.

Firstly, the vertex-coordinates $V(i,j)$ of one of the partial models constituting the three-dimensional model are read in (ST13). Here, i is a parameter indicating respective components of the vertex-coordinates and i=1, 2, 3 respectively indicate the X, Y, Z components. Furthermore, j is a parameter indicating respective vertices of the polygons constituting the partial model and here, the total number of vertices of the polygons constituting the partial model is taken as M. Therefore, j has values of j=1, 2, . . . , M.

Thereupon, the maximum value $MAX(i)$ and the minimum value $MIN(i)$ for each component of the vertex-coordinates of the partial model are calculated (ST15). The central-coordinates, $CEN(i)$ and the expansion factor, $RATE(i)$, are then derived from equations (1) and (2), using the maximum value $MAX(i)$ and the minimum value $MIN(i)$ (ST17). Here, the figure "65535" contained in equation (2) is the maximum value of the 16-bit integer.

Next, the converted vertex-coordinates $VD(i,j)$ are calculated from the vertex-coordinates $V(i,j)$, using the central-coordinates $CEN(i)$ and the expansion factor $RATE(i)$ in equation (3) (ST19). In other words, the central-coordinates $CEN(i)$ and expansion factor $RATE(i)$ are the conversion coefficients for setting the converted vertex-coordinates $VD(i,j)$ to values between "−32768 to +32767", which is the maximum range expressable by 16-bit integers having a sign. By means of the aforementioned calculations, the central-coordinates $CEN(i)$, expansion factor $RATE(i)$, and converted vertex-coordinates $VD(i,j)$ are calculated from the vertex-coordinates $V(i,j)$. In this manner, the central-coordinates $CEN(i)$ and expansion factor $RATE(i)$ are derived for each partial models, and the converted vertex-coordinates $VD(i,j)$ are derived for each vertex of the polygons constituting the partial models. Moreover, the central-coordinates $CEN(i)$ and expansion factor $RATE(i)$ are stored in a 32bit floating-point form, and the converted vertex-coordinates $VD(i,j)$ are stored in a 16-bit integer form. Conventionally, vertex-coordinates $V(i,j)$ have been stored as 32-bit floating-point values, and hence, by adopting the storage method of the present invention, it is possible to reduce by approximately one half, the storage volume of the stored vertex-coordinates, whilst preventing any reduction in accuracy.

Figure 5:
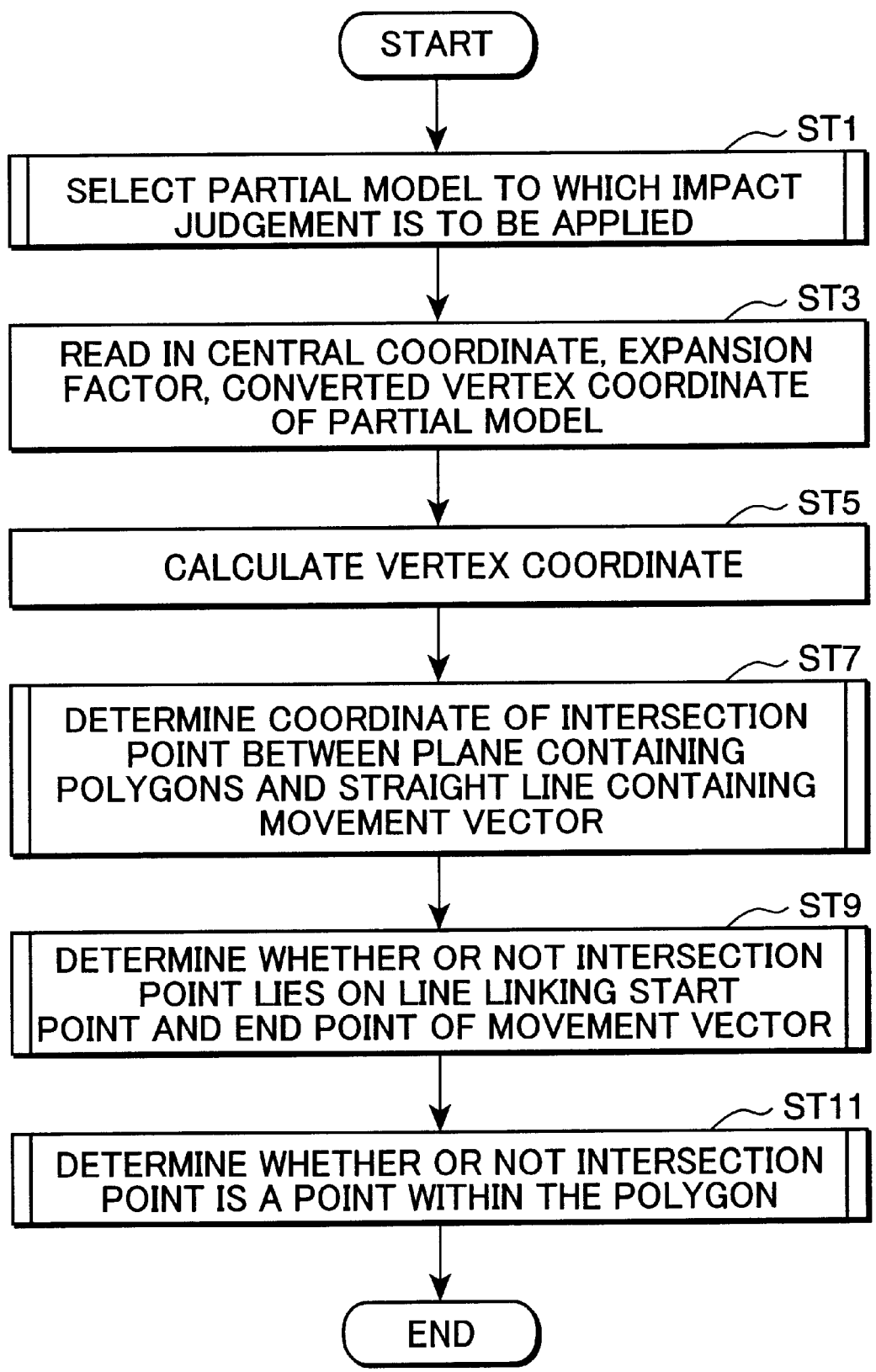
FIG. 5 is a flowchart showing an approximate sequence of impact judgement processing.

FIG. 5 is a flowchart showing the general procedure of impact judgement processing performed by the impact judgement device according to the present invention. Firstly, a judgement subject partial model is selected to be the partial model to which impact judgement is applied pursuant to the first judgement section 11a, from the partial models constituting the three-dimensional model (ST1). Next, the central-coordinates, expansion factor and converted vertex-coordinates, which form the model data for the selected judgement subject partial model, are read in respectively from the central-coordinates storing section 811, expansion factor storing section 812 and converted vertex-coordinates storing section 813 of the model storing section 81 (ST3).

The vertex-coordinates calculating section 11b1 then calculates the vertex-coordinates of the judgement subject partial model by dividing the converted vertex-coordinates by the expansion factor, and then adding the central-coordinates (ST5). Next, the coordinates of the intersection point between the plane containing the respective polygons constituting the judgement subject partial model and the straight line containing the movement vector of the moving object are calculated (ST7) pursuant to the intersection point calculating section 11b2. The first intersection judgement section 11b3 then determines whether or not the aforementioned intersection point lies on a line linking the start point and end point of the movement vector of the moving object (ST9).

The second intersection judgement section 11b4 then judges whether or not the aforementioned intersection point is a point within the corresponding polygons (ST11). The processing from step ST7 to step ST11 is performed for each polygon constituting the judgement subject partial model. Furthermore, if the intersection point determined at step ST7 is judged at step ST9 to lie on the line linking the start point and end point of the movement vector of the moving object, and if, moreover, it is judged to be inside the corresponding polygons at step ST11, then that intersection point is judged to be an impact.

Figure 6:
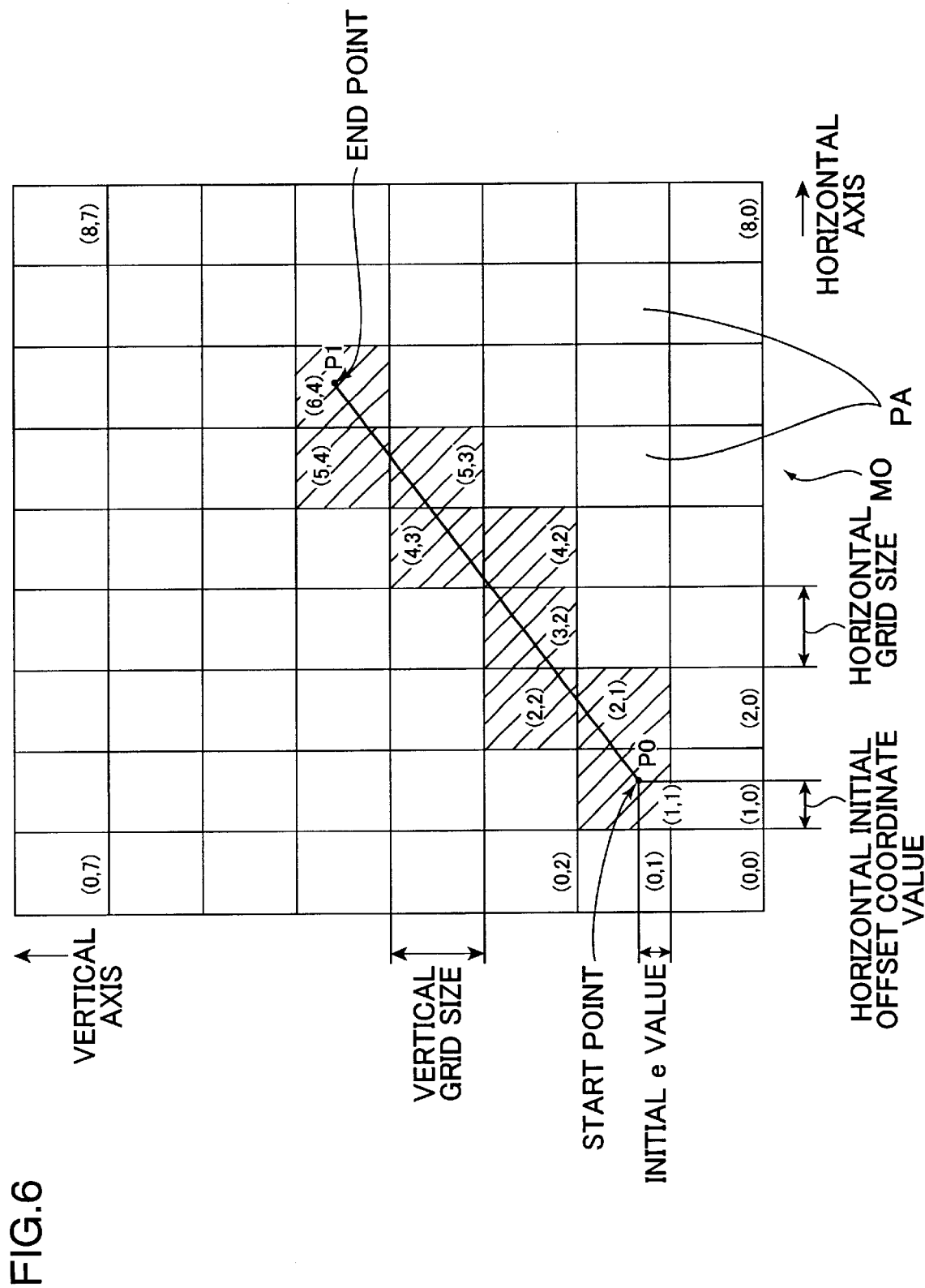
FIG. 6 is an illustrative diagram of judgement subject partial model selection processing.

FIG. 6 is an illustrative diagram of the judgement subject partial model selection processing performed by the first selecting section 11a. This diagram shows the movement vector and three-dimensional model as projected onto a two-dimensional plane, and here, the three-dimensional MO is divided equidistantly into 8 parts in the vertical axis direction and is divided equidistantly into 9 parts in the horizontal axis direction, thereby forming a total of 8×9=72 partial models PA. The rectangular shape at the outermost perimeter of the object corresponds to the outer perimeter three-dimensional model, the grid lines correspond to the boundary lines between one partial model PA and another partial model PA, and the rectangular shapes having a perimeter formed by adjacent grid lines in the vertical axis direction and adjacent grid lines in the horizontal axis direction correspond to the outer perimeter of one partial model PA. Furthermore, the diagonally shaded portion of the diagram, which comprises partial models PA containing a portion of the line LP linking the start point P0 and end point P1 of the movement vector of the moving object, shows the judgement subject partial models PA0T selected by the first judging section 11a. Here, there are a total of nine judgement subject partial models PA0T. Moreover, partial model PA, which is the Kth from the left and the Lth from the bottom, is represented by (K−1, L−1) in terms of coordinates, these being termed grid coordinates, or which the horizontal axis component (K−1) is termed a horizontal grid coordinate, and the vertical axis component (L−1) is termed a vertical grid coordinate.

Figure 7:
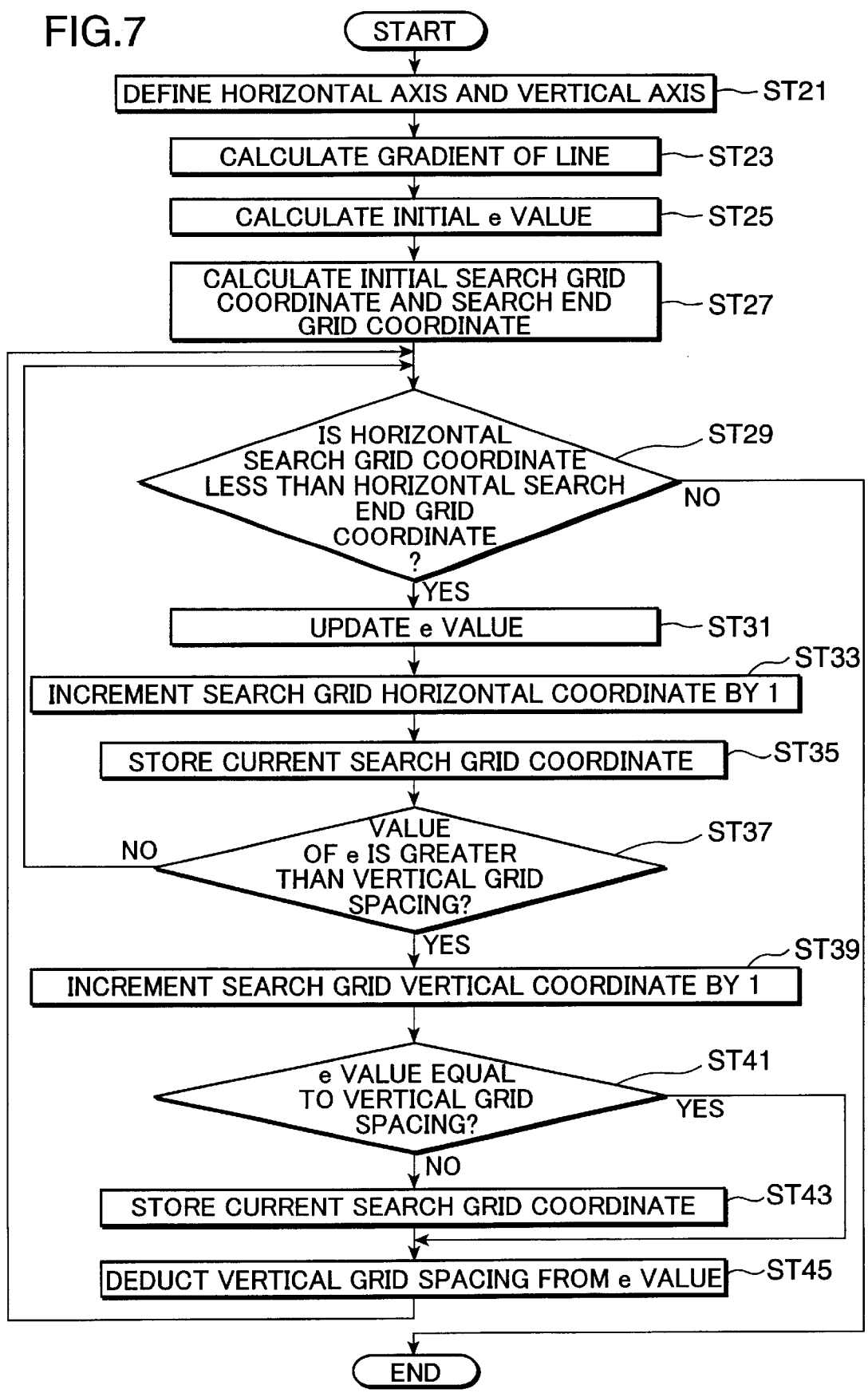
FIG. 7 is a flowchart of judgement subject partial model selection processing.

FIG. 7 is a flowchart of judgement subject partial model selection processing as performed by the first judgement section 11a. Here, as shown in FIG. 6, a description is given of the procedure for determining the grid coordinates of the partial models in the shaded section of FIG. 6 (Judgement subject partial models), by previously projecting the movement vector and three-dimensional model onto a two-dimensional plane. Firstly, the vertical axis and horizontal axis are set in such a manner that the length of the line LP in the horizontal direction is greater than the length thereof in the vertical direction (ST21). If the length of the line LP in the horizontal direction is shorter than its length in the vertical direction, then the vertical axis and horizontal axis are mutually exchanged. Next, the gradient of the line LP is calculated (ST23). Here, a case involving a positive gradient of the line LP is described. If the gradient of the line LP is negative, then the same processing as that described below should be implemented, but reversing the positive/negative value of the vertical coordinates.

An initial value of the parameter e for finding a judgement subject partial model is set according to the following procedure (ST25). Firstly, the remainder resulting from dividing the vertical coordinate value of the start point P0 of the movement vector by the vertical grid spacing is derived. If this remainder is positive, then it is set as the initial value of the parameter e, and if it is negative, then the initial value of the parameter e is set as the sum of the aforementioned remainder plus the vertical grid spacing.

Next, the initial search grid coordinates, which are the grid coordinates of the partial model situated at the start point P0 of the movement vector, and the search end grid coordinates, which are the grid coordinates of the partial model situated at the end point P1 of the movement vector, are calculated (ST27). In this flowchart, the search for judgement subject partial models starts from the partial model situated at the start point P0, and proceeds towards the partial model situated at the end point P1. In FIG. 6, the initial search grid coordinates are (1,1), and the search end grid coordinates are (6,4).

Thereupon, it is judged whether or not the horizontal search grid coordinate, which is the horizontal component of the grid coordinates in the current search, is smaller than the horizontal search end grid coordinate (ST29). If the horizontal search grid coordinate is smaller than the horizontal search end grid coordinate, then the sequence proceeds to step ST31. If the horizontal search grid coordinate is equal to or greater than the horizontal search end grid coordinate, then the processing terminates.

The value of the parameter e is updated by the following procedure (ST31). When updating the initial value of the parameter e, (updated value of e)=((gradient)×((horizontal grid spacing)−(horizontal initial offset coordinate value)))+(value of e before update), and when updating the second and subsequent values of parameter e, (updated value of e)=((gradient)×horizontal grid spacing)+(value of e before update). Here, the horizontal initial offset coordinate value is the difference between the horizontal component of the coordinates of the movement vector start point P0, and the horizontal component of the bottom left coordinates of the partial model situated at start point P0.

Next, the horizontal search grid coordinate is updated by the following procedure (ST33). At the initial updating operation, the horizontal search grid coordinate is unchanged (same as current value), and from the second update onwards, the horizontal search grid coordinate is incremented. The current search grid coordinates are stored as grid coordinates for the judgement subject partial model (ST35).

Thereupon, it is judged whether or not the value of parameter e is equal to or greater than the vertical grid spacing (ST37). If the value of parameter e is less than the vertical grid spacing, then the processing returns to step ST29. If the value of parameter e is equal to or greater than the vertical grid spacing, then the vertical search grid coordinate is incremented (ST39). It is then determined whether or not the value of parameter e and the vertical grid spacing are equal (ST41). If the value of parameter e and vertical grid spacing are equal, then the processing advances to step ST45. If the value of parameter e and vertical grid spacing are not equal, then the current search grid coordinates are stored as the grid coordinates of the judgement subject partial model (ST43). The vertical grid spacing is then subtracted from the value of parameter e (ST45), and the process returns to step ST29.

Figure 8:
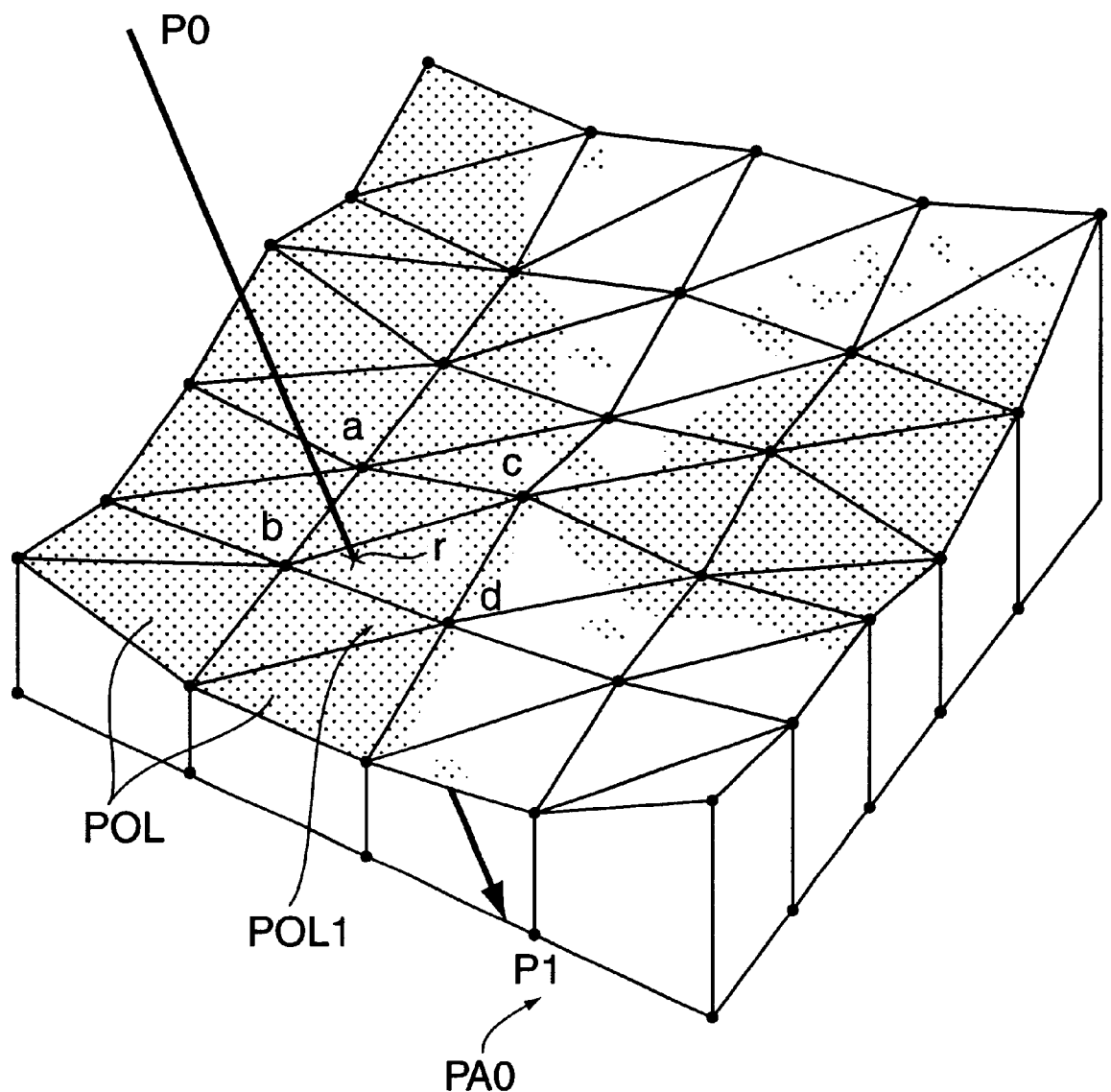
FIG. 8 is an illustrative diagram of impact judgement processing corresponding to the polygons constituting the judgement subject partial model.

FIG. 8 is an illustrative diagram of impact judgement processing relating to polygons constituting a judgement subject partial model, as performed by the second judgement section 11b. The partial model PA is a single partial model judged by the first judgement section 11a to be a judgement subject partial model, which is a partial model to which impact judgement is applied. The partial model PA is constituted by a plurality of polygons POL, of which polygon POL1 having vertices b, c, d, intersects at point r with the movement vector of the moving object starting at point P0 and ending at point P1, and hence is taken as the polygon for which impact judgement is to be implemented.

Figure 9:
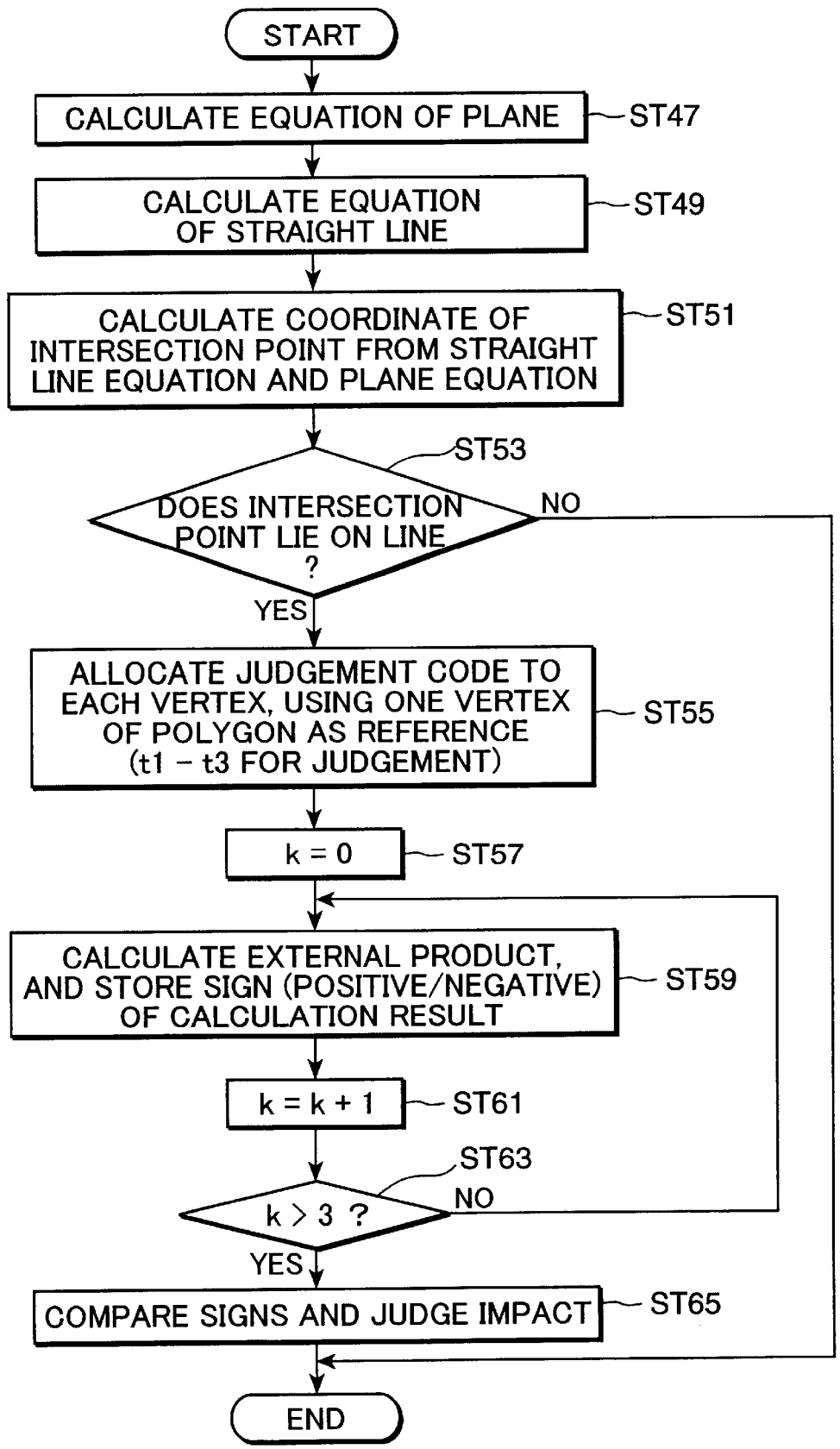
FIG. 9 is a flowchart of impact judgement processing corresponding to the polygons constituting the judgement subject partial model.

FIG. 9 is a flowchart of impact judgement processing relating to a polygon constituting a judgement subject partial model, as performed by the second judgement section 11b. This processing is carried out for each polygon constituting the judgement subject partial model. Firstly, the equation of the plane containing the polygon (containing all vertices forming the polygon) is determined (ST47). Next, the equation of the straight line linking the start point P0 and end point P1 of the movement vector of the moving object is determined (ST48). The coordinates of intersection point r are then derived by solving the aforementioned plane equation and the aforementioned straight line equation, simultaneously (ST51). The processing from step ST47 to step ST51 is performed by the intersection point calculating section 11b2.

Thereupon, the first intersection judgement section 11b3 judges whether or not the intersection point r lies on a straight line linking the start point P0 and end point P1 of the movement vector (ST53). This judgement step is made by determining whether or not the values of the respective components of the coordinates of intersection point r lie within the range of values of the respective components of the movement vector start point P0 coordinates and end point coordinates P1. If this intersection point r lies on a line linking the start point P0 and end point P1 of the movement vector, then no impact is judged for that polygon, and the processing ends.

If the intersection point r does lie on a straight line linking the start point P0 and end point P1 of the movement vector, then the respective vertices constituting the polygon are assigned codes of t(1), t(2), t(3), taking one vertex thereof as a reference point (ST55). Here, t(4) is taken as t(4)=t(1). Next, the parameter k which counts the vertices is initialized to 1 (ST57). The external product VT(k) of the vector starting at vertex t(k) and ending at vertex t(k+1), and the vector starting at intersection point p and ending at vertex t(k) is calculated, and the sign thereof is stored for each component (ST59).

Thereupon, the parameter k is incremented (ST61), and it is then judged whether or not the parameter k is greater than three (ST63). If parameter k is equal to or less than three, then the processing returns to step ST59. If the parameter k is greater than 3, then it is judged whether or not an impact has occurred, by determining whether or not the signs of the respective components of the external product VT(1), external product VT(2) and external product VT(3) are matching (ST65). If the signs of the respective components of the external product VT(1), external product VT(2) and external product VT(3) are all matching, then an impact is concluded, and they do not all match, then no impact is concluded. The processing from step ST55 to step ST65 is carried out by the second intersection judgement section 11b4.

Figure 10:
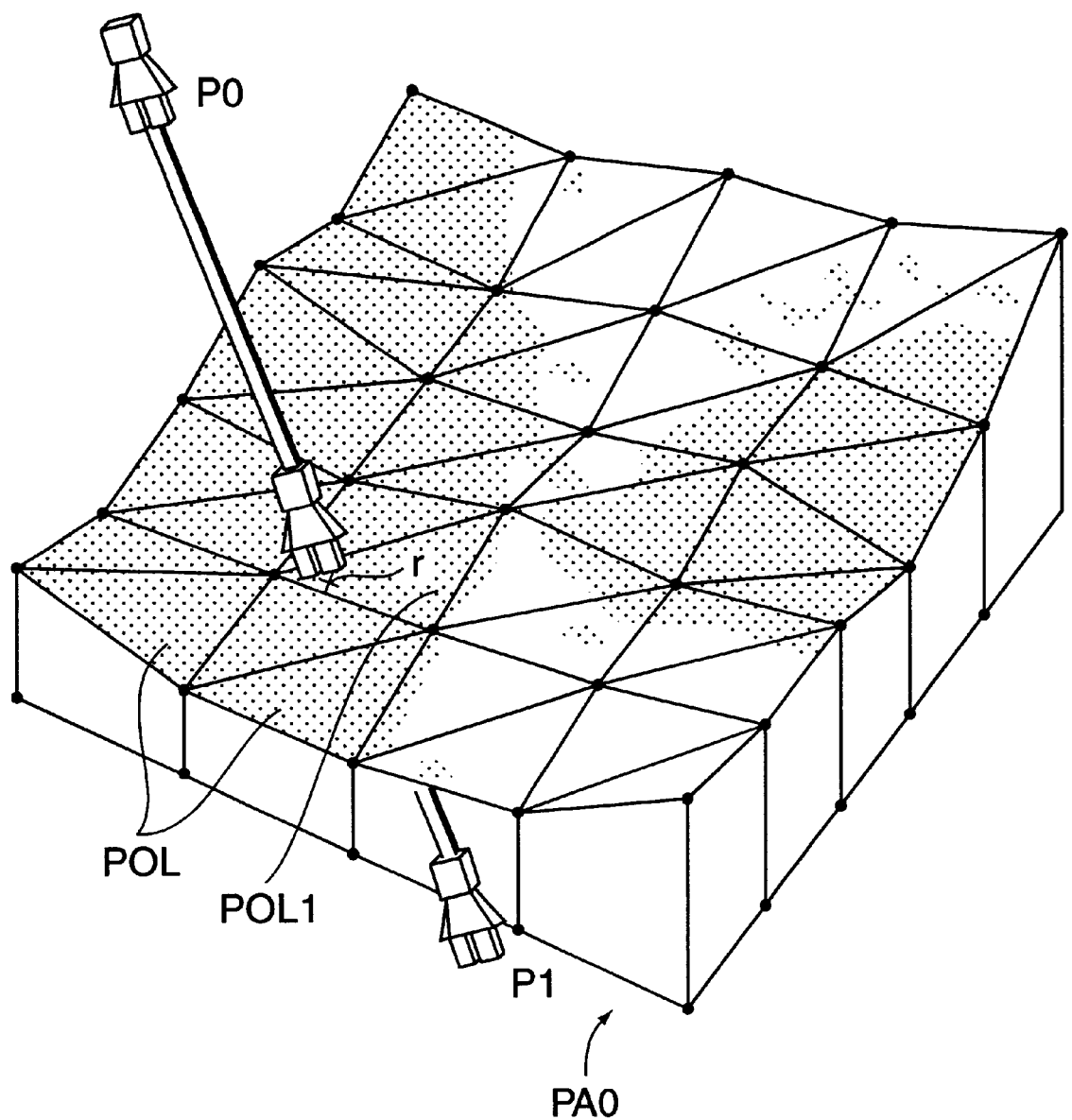
FIG. 10 is an illustrative diagram showing a state where a moving object is positioned after performing impact judgement for the judgement subject partial model.

FIG. 10 is an illustrative diagram showing a state where the moving object is positioned, after impact judgement for the judgement subject partial model of FIG. 8 has been carried out. The judgement subject partial model PAO is constituted by a plurality of polygons POL, of which the polygon POLL having vertices at points b, c, d intersects at point r with the movement vector of the moving object IM having a start point P0 and end point P1, and is judged by the second judging section 11b to be an impact. Consequently, the moving object IM is positioned at point r.

The present invention can adopt the following modes.

(A) The embodiment of the invention described a case where the vertex-coordinates of the three-dimensional model for performing impact judgement are expressed using the central-coordinates, expansion factor and converted vertex-coordinates, but it is also possible to adopt a mode where an operation other than impact judgement, such as image drawing, for example, is performed. By expressing the vertex-coordinates by means of central-coordinates, expansion factor, and converted vertex-coordinates, it is possible to reduce the storage volume of the memory used to store the vertex-coordinates, and hence the processing speed can be improved.

(B) The embodiment of the invention described a case where the three-dimensional model is constituted by a plurality of partial models, but a mode where the three-dimensional model is not divided into partial models is also possible. In this case, the first judging means becomes unnecessary, and the subject of the impact judgement performed by the second judging means becomes the three-dimensional model itself.

(C) The embodiment of the invention described a case where the three-dimensional model is projected in the height direction, but a mode where it is projected in a direction other than the height direction (lateral direction or longitudinal direction) may also be adopted. By selecting the direction in which it is projected, the number of judgement subject partial models selected by the first judging means is reduced, and hence impact judgement processing can be implemented at high-speed. Moreover, it is also possible to adopt a mode where judgement subject partial models are selected by projecting in a combination of any two directions, or in all three directions, of the respective directions, namely, the height direction, lateral direction and longitudinal direction. In this mode, judgement subject partial model selection is made for each direction in which the three-dimensional model is projected, and impact judgement should be performed for the partial models selected as judgement subject partial models is all the projection directions. In this case, it is possible further to reduce the number of partial models to which impact judgement is applied.

(D) The embodiment of the invention described a case where the polygons constituting a three-dimensional model are triangular polygons, but a mode using N-sided polygons (N being any integer of 4 or above) is also possible. In such a mode, the freedom of representation of the three-dimensional model is enhanced.

(E) The embodiment of the invention described a case where the model data is stored in a RAM 8, but it is also possible to adopt a mode where this data is called up as required to the RAM 8 from a storage medium 5, according to the development of the game. In this embodiment, there is an advantage in that the necessary capacity of the RAM 8 can be reduced.

Summing up the aforementioned descriptions, the present invention relates to an impact judgement device for judging impacts between a moving object moving in an artificial three-dimensional space and a three-dimensional model constituted by a plurality of polygons. The impact judgement device comprises: model storing means for storing the vertex-coordinates of the respective polygons of said three-dimensional model, and impact judging means for performing impact judgement using the movement vector of said moving object and said vertex-coordinates; wherein said model storing means represents said vertex-coordinates by means of central-coordinates being an average value of the maximum value and minimum value of the each of the coordinate components, an expansion factor to be used for achieving prescribed value by multiplication by the difference between the maximum value and minimum value of each coordinate component, and converted vertex-coordinates obtained by subtracting said central-coordinates from the respective vertex-coordinates and then multiplying by said expansion factor; and stores said central-coordinates and said expansion factor in a floating-point value form, and said converted vertex-coordinates in an integer form.

According to the aforementioned invention, vertex-coordinates which are conventionally stored as 32-bit floating point values, are expressed by central-coordinates, an expansion factor and converted vertex-coordinates, and since the converted vertex-coordinates are stored as 16-bit integer values, the memory capacity used to store the vertex-coordinates is reduced by approximately one-half, and impact judgement is performed rapidly.

In the aforementioned impact judgement device, said three-dimensional model can be constructed by combining a plurality of partial models, and said impact judging means may include first judging means for selecting a judgment subject partial model, being a partial model to which impact judgement is applied, and second judging means for performing impact judgement with regard to the polygons constituting said judgement subject partial model.

With the above feature, since impact judgement is performed with respect to the polygons of a partial model set as a subject for impact judgement from the partial models constituting the three-dimensional model, rather than performing impact judgement with respect to all the polygons constituting the three-dimensional model, the impact judgement processing is performed rapidly.

Furthermore, in the impact judgement device, said first judging means is preferably set to project said movement vector and said three-dimensional model onto a two-dimensional plane, and take a partial model containing all or a portion of the line linking the start point and end point of said movement vector as said judgement subject partial model.

With the above feature, since the partial model to which impact judgement is to be applied is selected by projecting the moving object and three-dimensional model onto a two-dimensional plane, it is possible to select the partial model to which impact judgement is to be applied in an efficient manner.

Moreover, in the aforementioned impact judgement device, wherein said second judging means may comprise vertex-coordinates calculating means for calculating respective vertex-coordinates for the polygons constituting said judgement subject partial model, from said central-coordinates, said expansion factor, and said converted vertex-coordinates; intersection point calculating means for calculating the coordinates of an intersection point between the plane containing the respective polygons and a straight line containing said movement vector; first intersection point judging means for judging whether or not said intersection point lies on a straight line linking the start point and end point of said movement vector; and second intersection point judging means for judging whether or not said intersection point lies within said polygons.

With the above feature, the intersection point between the plane containing the respective polygons constituting the judgement subject partial model and the straight line containing the aforementioned movement vector is calculated, it is judged whether or not the intersection point lies on a straight line linking the start point and end point of the movement vector, and it is judged whether or not the intersection point lines within said polygons, and therefore impact judgement is performed rapidly and accurately.

Another aspect of the present invention takes a form of a computer-readable recording medium for recording an impact judgement processing program for judging impacts between a moving object moving in an artificial three-dimensional space and a three-dimensional model constituted by a plurality of polygons. In which said impact judgement processing program comprises the steps of: storing the vertex-coordinates of the respective polygons of said three-dimensional model; performing an impact judgement for judging impacts by using the movement vector of said moving object and said vertex-coordinates; representing said vertex-coordinates by means of central-coordinates being average value of the maximum value and minimum value of each of the coordinate components, an expansion factor to be used for achieving prescribed values by multiplication by the difference between the maximum value and minimum value of each coordinate component, and converted vertex-coordinates obtained by subtracting said central-coordinates from the respective vertex-coordinates and then multiplying by said expansion factor; storing said central-coordinates and said expansion factor in a floating-point value form; and storing said converted vertex-coordinates being stored in integer form.

According to the above aspect of the invention, vertex-coordinates which are conventionally stored as 32-bit floating point values, are expressed by central-coordinates, an expansion factor and converted vertex-coordinates, and since the converted vertex-coordinates are stored as 16-bit integer values, the memory capacity used to store the vertex-coordinates is reduced by approximately one-half, and impact judgement is performed rapidly.

In addition, in the computer-readable recording medium for recording an impact judgement processing program, said three-dimensional model can be constituted by combining a plurality of partial models, and said impact judgement processing may comprise first judgement processing for selecting a judgement subject partial model, being a partial model to which impact judgement is applied, and second judgement processing for performing impact judgement with regard to the polygons constituting said judgement subject partial model.

With the aforementioned feature, since impact judgement is performed with respect to the polygons of a partial model set as a subject for impact judgement from the partial models constituting the three-dimensional model, rather than performing impact judgement with respect to all the polygons constituting the three-dimensional model, the impact judgement processing is performed rapidly.

In the aforementioned computer-readable recording medium for recording a three-dimensional image processing program, said first judgement processing can be set to project said movement vector and said three-dimensional model onto a two-dimensional plane, and take a partial model containing all or a portion of the straight line linking the start point and end point of said movement vector as said judgement subject partial model.

With the aforementioned feature, since the partial model to which impact judgement is to be applied is selected by projecting the moving object and three-dimensional model onto a two-dimensional plane, it is possible to select the partial model to which impact judgement is to be applied in an efficient manner.

In addition, in the computer-readable recording medium for recording a three-dimensional image processing program, said second judgement processing may comprise: vertex-coordinates calculation processing for calculating respective vertex-coordinates for the polygons constituting said judgement subject partial model, from said central-coordinates, said expansion factor, and said converted vertex-coordinates; intersection point calculation processing for calculating the coordinates of an intersection point between the plane containing the respective polygons and a straight line containing said movement vector; first intersection point judgement processing for judging whether or not said intersection point lies on a straight line linking the start point and end point of said movement vector; and second intersection point judgement processing for judging whether or not said intersection point lies within said polygons.

With the above feature, the intersection point between the plane containing the respective polygons constituting the judgement subject partial model and the straight line containing the aforementioned movement vector is calculated, it is judged whether or not the intersection point lies on a straight line linking the start point and end point of the movement vector, and it is judged whether or not the intersection point lines within said polygons, and therefore impact judgement is performed rapidly and accurately.

Another form of the present invention takes an impact judgement method for judging impacts between a moving object moving in an artificial three-dimensional space and a three-dimensional model constituted by a plurality of polygons, wherein the vertex-coordinates of the respective polygons of said three-dimensional model are stored. The method comprises the steps of: performing an impact judgement for judging impacts by using the movement vector of said moving object and said vertex-coordinates; representing said vertex-coordinates by means of central-coordinates being average values of the maximum value and minimum value of each of the coordinate components, an expansion factor for achieving prescribed values by multiplication by the difference between the maximum value and minimum value of each coordinate component, and converted vertex-coordinates obtained by subtracting said central-coordinates from the respective vertex-coordinates and then multiplying by said expansion factor; storing said central-coordinates and said expansion factor in a floating-point value form; and storing said converted vertex-coordinates in an integer form.

According to the aforementioned form of the invention, vertex-coordinates which are conventionally stored as 32-bit floating point values, are expressed by central-coordinates, an expansion factor and converted vertex-coordinates, and since the converted vertex-coordinates are stored as 16-bit integer values, the memory capacity used to store the vertex-coordinates is reduced by approximately one-half, and impact judgement is performed rapidly.

Another aspect of the present invention takes a form of a video game device which comprises an impact judgement device according to any one of the aforementioned features, image display means for displaying images containing said three-dimensional model and said moving object; program storing means for recording game program data; and externally operable operating means; wherein said impact judgement device performs impact judgement according to the aforementioned game program data.

According to the aforementioned aspect of the present invention, a video game device capable of performing rapid and accurate impact judgement can be achieved.

This application is based on Japanese Patent Application serial No. 2000-363542 filed in Japanese Patent Office on Nov. 29, 2000, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modification depart from the scope of the present invention hereinafter defined, they should be construed as being included therein.

What is claimed is:

1. An impact judgement device for judging impacts between a moving object moving in an artificial three-dimensional space and a three-dimensional model constituted by a plurality of polygons, the impact judgement device comprising:

model storing means for storing the vertex-coordinates of the respective polygons of said three-dimensional model, and impact judging means for performing impact judgement using the movement vector of said moving object and said vertex-coordinates;

wherein said model storing means represents said vertex-coordinates by means of central-coordinates being an average value of the maximum value and minimum value of the each of the coordinate components, an expansion factor to be used for achieving prescribed value by multiplication by the difference between the maximum value and minimum value of each coordinate component, and converted vertex-coordinates obtained by subtracting said central-coordinates from the respective vertex-coordinates and then multiplying by said expansion factor; and stores said central-coordinates and said expansion factor in a floating-point value form, and said converted vertex-coordinates in an integer form.

2. The impact judgement device according to claim 1, wherein said three-dimensional model is constructed by combining a plurality of partial models, and said impact judging means includes first judging means for selecting a judgment subject partial model, being a partial model to which impact judgement is applied, and second judging means for performing impact judgement with regard to the polygons constituting said judgement subject partial model.

3. The impact judgement device according to claim 2, wherein said first judging means projects said movement vector and said three-dimensional model onto a two-dimensional plane, and takes a partial model containing all or a portion of the line linking the start point and end point of said movement vector as said judgement subject partial model.

4. The impact judgement device according to claim 2, wherein said second judging means comprises:

vertex-coordinates calculating means for calculating respective vertex-coordinates for the polygons constituting said judgement subject partial model, from said central-coordinates, said expansion factor, and said converted vertex-coordinates;

intersection point calculating means for calculating the coordinates of an intersection point between the plane containing the respective polygons and a straight line containing said movement vector;

first intersection point judging means for judging whether or not said intersection point lies on a straight line linking the start point and end point of said movement vector; and second intersection point judging means for judging whether or not said intersection point lies within said polygons.

5. A computer-readable recording medium for recording an impact judgement processing program for judging impacts between a moving object moving in an artificial three-dimensional space and a three-dimensional model constituted by a plurality of polygons, said impact judgement processing program comprising the steps of:

storing the vertex-coordinates of the respective polygons of said three-dimensional model;

performing an impact judgement for judging impacts by using the movement vector of said moving object and said vertex-coordinates;

representing said vertex-coordinates by means of central-coordinates being average value of the maximum value and minimum value of each of the coordinate components, an expansion factor to be used for achieving prescribed values by multiplication by the difference between the maximum value and minimum value of each coordinate component, and converted vertex-coordinates obtained by subtracting said central-coordinates from the respective vertex-coordinates and then multiplying by said expansion factor;

storing said central-coordinates and said expansion factor in a floating-point value form; and storing said converted vertex-coordinates being stored in integer form.

6. The computer-readable recording medium for recording an impact judgement processing program according to claim 5, wherein said three-dimensional model is constituted by combining a plurality of partial models, and said impact judgement processing comprises first judgement processing for selecting a judgement subject partial model, being a partial model to which impact judgement is applied, and second judgement processing for performing impact judgement with regard to the polygons constituting said judgement subject partial model.

7. The computer-readable recording medium for recording a three-dimensional image processing program according to claim 6, wherein said first judgement processing projects said movement vector and said three-dimensional model onto a two-dimensional plane, and takes a partial model containing all or a portion of the straight line linking the start point and end point of said movement vector as said judgement subject partial model.

8. The computer-readable recording medium for recording a three-dimensional image processing program according to claim 6, wherein said second judgement processing comprises: vertex-coordinates calculation processing for calculating respective vertex-coordinates for the polygons constituting said judgement subject partial model, from said central-coordinates, said expansion factor, and said converted vertex-coordinates; intersection point calculation processing for calculating the coordinates of an intersection point between the plane containing the respective polygons and a straight line containing said movement vector; first intersection point judgement processing for judging whether or not said intersection point lies on a straight line linking the start point and end point of said movement vector; and second intersection point judgement processing for judging whether or not said intersection point lies within said polygons.

9. An impact judgement method for judging impacts between a moving object moving in an artificial three-dimensional space and a three-dimensional model constituted by a plurality of polygons, wherein the vertex-coordinates of the respective polygons of said three-dimensional model are stored, said method comprising the steps of:

performing an impact judgement for judging impacts by using the movement vector of said moving object and said vertex-coordinates;

representing said vertex-coordinates by means of central-coordinates being average values of the maximum value and minimum value of each of the coordinate components, an expansion factor for achieving prescribed values by multiplication by the difference between the maximum value and minimum value of each coordinate component, and converted vertex-coordinates obtained by subtracting said central-coordinates from the respective vertex-coordinates and then multiplying by said expansion factor;

storing said central-coordinates and said expansion factor in a floating-point value form; and storing said converted vertex-coordinates in an integer form.

10. A video game device comprising:

an impact judgement device for judging impacts between a moving object moving in an artificial three-dimensional space and a three-dimensional model constituted by a plurality of polygons, the impact judgement device including:

model storing means for storing the vertex-coordinates of the respective polygons of said three-dimensional model, and impact judging means for performing impact judgement using the movement vector of said moving object and said vertex-coordinates;

wherein said model storing means represents said vertex-coordinates by means of central-coordinates being an average value of the maximum value and minimum value of the each of the coordinate components, an expansion factor to be used for achieving prescribed value by multiplication by the difference between the maximum value and minimum value of each coordinate component, and converted vertex-coordinates obtained by subtracting said central-coordinates from the respective vertex-coordinates and then multiplying by said expansion factor; and stores said central-coordinates and said expansion factor in a floating-point value form, and said converted vertex-coordinates in an integer form an image display means for displaying images containing said three-dimensional model and said moving object;

program storing means for recording game program data; and externally operable operating means; wherein said impact judgement device performs impact judgement according to the aforementioned game program data.

* * * * *